INVENTORS.
ROBERT S. MAUL
ALBERT C. KINSEY, JR.
BY
Seidel, Gonda & Goldhammer
ATTORNEYS.

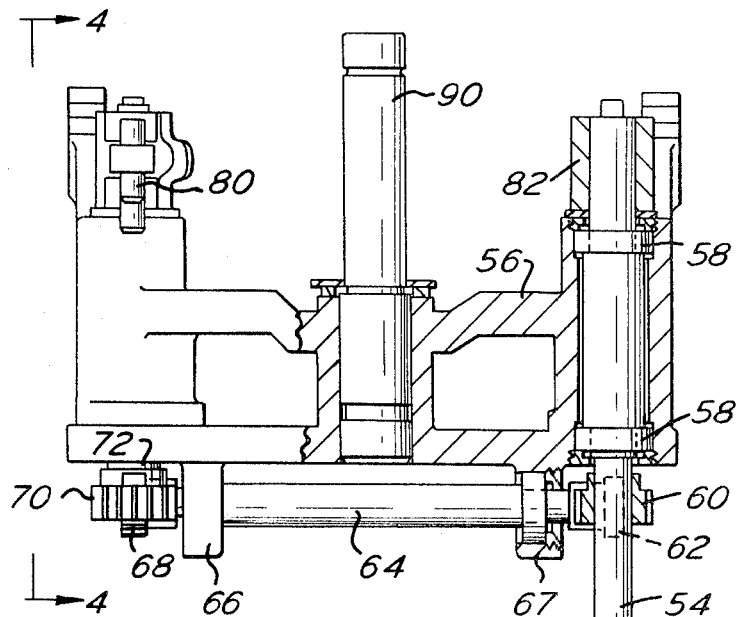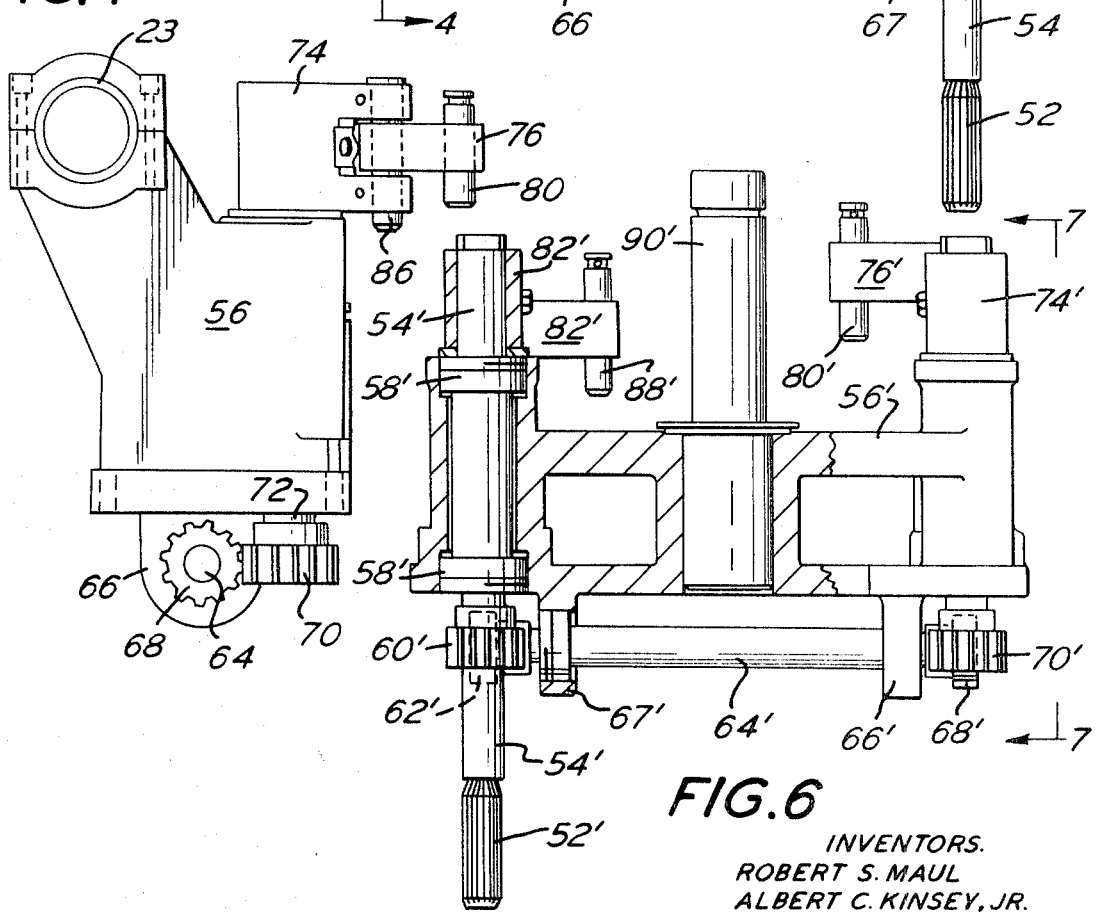

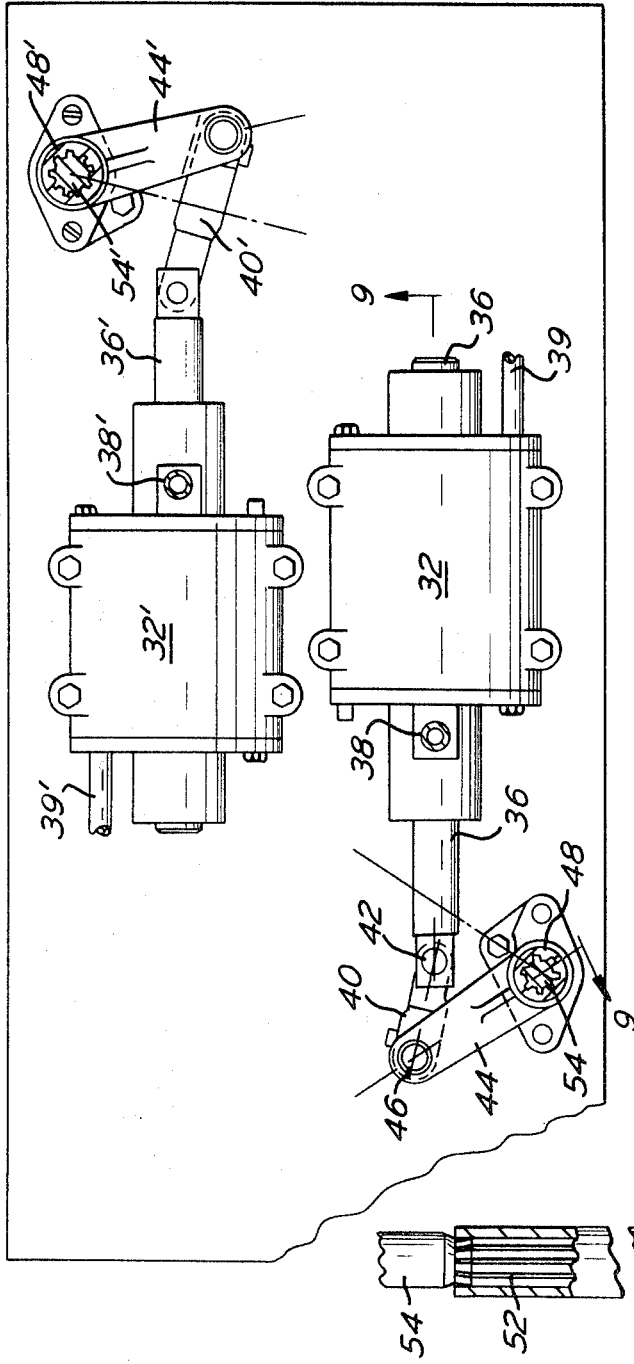
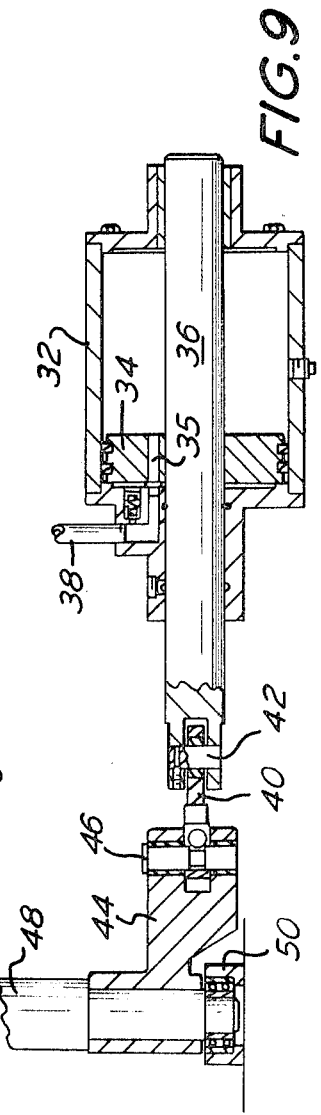

United States Patent Office 3,591,358
Patented July 6, 1971

3,591,358
GLASSWARE MOLD OPENING AND CLOSING MECHANISM WITH UNIFIED DRIVE MEANS
Robert S. Maul and Albert C. Kinsey, Jr., Millville, N.J., assignors to Maul Bros., Inc., Millville, N.J.
Filed Apr. 22, 1969, Ser. No. 818,319
Int. Cl. C03b 9/00
U.S. Cl. 65—360
3 Claims

ABSTRACT OF THE DISCLOSURE

The opening and closing of molds in a glassware forming machine, such as an I.S. machine, is attained with greater pressure using a simpler linkage than that used heretofore. The mold holder arms on the blank or blow station are connected to a pair of shafts of which only one is directly connected to a motor. The other shaft is drivingly connected to said one shaft so that both shafts may oscillate in opposite directions in unison.

---

This invention relates to a glassware forming machine, such as an I.S. machine also known as an individual section machine, in connection with the manufacture of glassware such as bottles and other containers. In the art to which the present invention pertains, an I.S. machine is well known to those skilled in the art. In an I.S. machine, there is provided in one machine a plurality of individually operable sections. Each section includes a blow mold station and a blank mold station. At these stations, a pair of molds are supported by mold holder arms. The mold holder arms are moved toward and away from each other to close the molds. The present invention is particularly directed to a station having such mold holder arms and the means for moving the mold holder arms in unison.

The size of glassware made on I.S. machines has gradually increased over the years so as to be substantially larger than that originally contemplated by the designer of the machine. For a typical patent illustrating the basic I.S. machine, see Pat. 1,911,119. The pressure which must be applied to hold the molds closed has increased to the point whereby it cannot be maintained by the actuating mechanism disclosed in FIG. 8 of said patent. The present invention increases the pressure over that attainable by the structure disclosed in the above-mentioned patent while at the same time being simpler and being capable of use in standard I.S. machines without modifying the same to any substantial extent. That is, the present invention utilizes components which are receivable within the confines of the frame presently utilized on existing as well as new I.S. machines.

In accordance with the present invention, there is provided a glassware forming machine having a mold station at which is located a pair of mold holder arms, a separate shaft which rotatably supports each arm, motor means are provided for oscillating the shafts in unison in opposite directions, with one shaft being connected to said motor means. Means are provided connecting said one shaft to the other shaft. The details of the manner in which said one shaft is connected to the motor means and to the other shaft are set forth hereinafter.

It is an object of the present invention to provide a novel I.S. machine having an improved support and actuation means for mold holder arms.

It is another object of the present invention to provide an I.S. machine wherein the mold holder arms are actuated in a novel manner which is simple, capable of being accommodated in conventional I.S. machines, and which provides for greater holding force at the parting line of molds.

It is another object of the present invention to provide a novel method for operating the mold holder arms in a glassware forming machine in a more efficient manner and with greater closing force.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a sectional view taken along the line 3—3 in FIG. 2.

FIG. 4 is an end view taken along the line 4—4 in FIG. 3.

FIG. 6 is a sectional view taken along the line 6—6 in FIG. 5.

FIG. 8 is a sectional view taken along the line 8—8 in FIG. 1.

FIG. 9 is a sectional view taken along the line 9—9 in FIG. 8.

Figure 1:
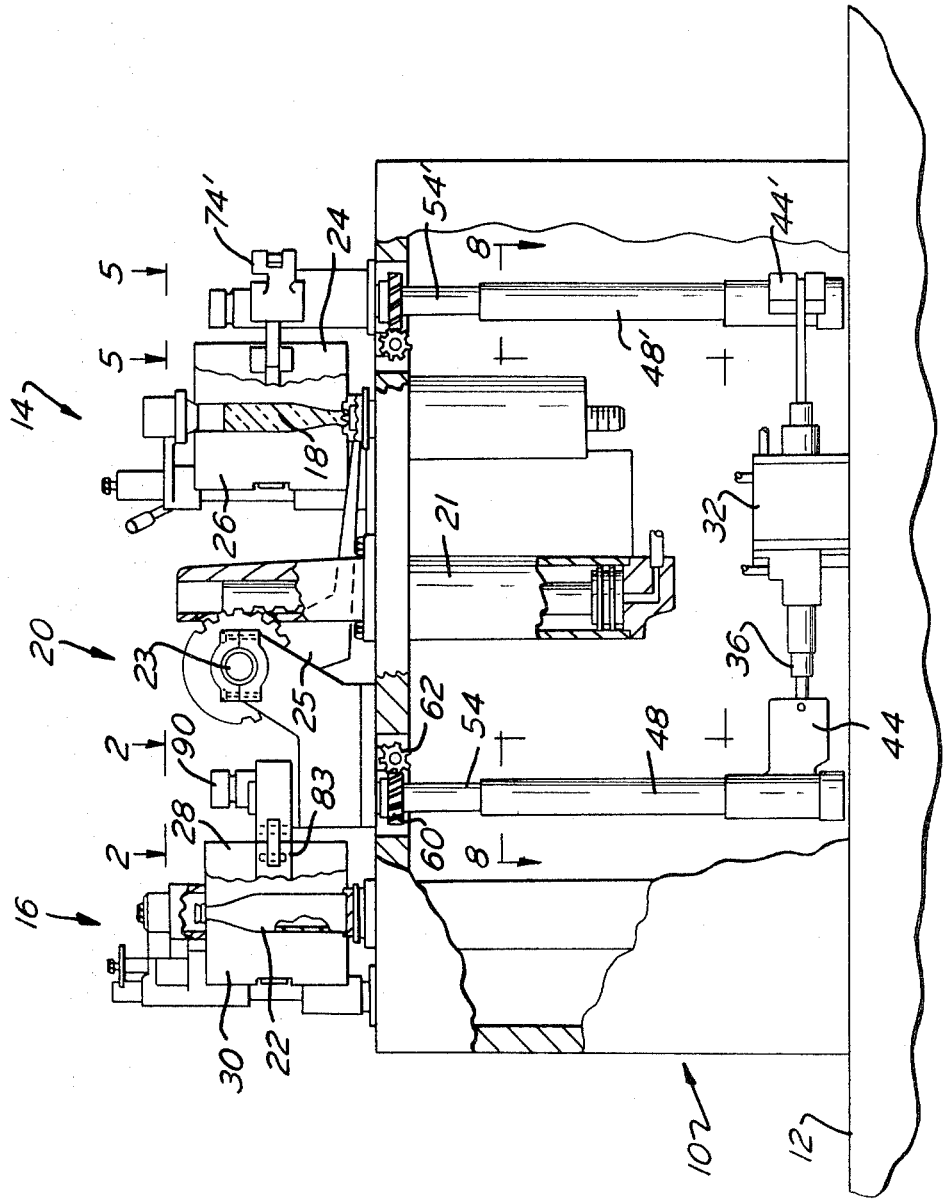
FIG. 1 is a partial elevation view, partly in section, of one section of an I.S. machine in accordance with the present invention.

Referring to the drawing in detail, wherein like numerals indicate like elements, there is shown in FIG. 1 one section of an I.S. machine designated generally as 10 mounted on a floor or other supporting surface 12.

The I.S. machine 10 includes a frame partially broken away for purposes of illustration. On the frame, there is provided a blank mold station 14 and a blow mold station 16. At the blank mold station 14, gobs of glass are shaped into the form of parison 18 and the neck of the container is formed within the blank molds 24 and 26. Thereafter, the invert mechanism designated generally as 20 transfers the parison to the blow mold station 16. At the blow mold station 16, the parison 18 is blown into a bottle 22 while held within the blow molds 28 and 30. Thereafter, the finished bottle is transferred onto a dead plate from which it is subsequently transferred onto a moving conveyor for delivery to heat treating apparatus.

The invert mechanism 20 is conventional and includes a motor such as air cylinder 20 having a rack connected to a pinion on shaft 23. Shaft 23 is provided with an invert arm 25. For a typical illustration of an invert mechanism, reference is made to Pat. 2,994,984.

In order to cause the molds 24 and 26 to operate in unison in opposite directions at the blank mold station 14 while the blow molds 28 and 30 move toward and away from each other in unison at the blow mold station 16, there is provided an actuating means within the frame. The actuating means includes duplicate components for separately operating the mold holder arms at the stations 14 and 16. Only the components for actuating the mold holder arms at blow mold station 16 will be described in detail hereinafter with corresponding primed numerals being provided on the corresponding structure for actuating the mold holder arms at the blank mold station 14.

The actuator means for the mold holder arms at the blow mold station 16 includes a motor 32 which preferably is an air motor. Other equivalent motors may be utilized. Air motor 32, as shown more clearly in FIG. 9, includes a housing within which is disposed a piston 34 secured to the outer periphery of a piston rod 36. Piston rod 36 extends through the opposite ends of the header on the housing. A tapered plug 35 is provided on the piston in any convenient manner such as by force-fitting the pin into a hole in the piston 34. The plug 50 cooperates with the exhaust passage connected to exhaust conduit 38 to limit the exhause of fluid pressure from the cylinder as the piston approaches the lefthand end of its stroke in FIG. 9. A conduit 39 is provided for introducing air into the cylinder housing at the opposite end from conduit 38.

The lefthand end of the piston rod 36 in FIG. 9 is pivotably connected to a link 40 by means of a pin 42. Link 40 is pivotably connected to a lever arm 44 by means of a pin 46. Lever arm 44 is fixedly secured to an internally splined upright drive shaft 48 rotatably supported at its lower end by bearings 50.

An upper shaft 54 having splines at its lower end is provided. The splines 52 mesh with the splines on the inner surface of the hollow shaft 48.

As shown more clearly in FIG. 3, the upper shaft 54 extends through a bore in a housing 56 mounted on top of the frame. The shaft 54 is provided with an enlarged diameter portion retained within said bore by means of bearings 58 and threated rings.

A helical gear 60 is fixedly secured to shaft 54. Gear 60 meshes with helical gear 62 on shaft 64. Shaft 64 is perpendicular to and offset from shaft 54. Shaft 64 extends through bearings supported by downwardly extending ears 66 and 67 on the housing 56.

As shown more clearly in FIGS. 3 and 4, a helical gear 68 is fixedly secured to shaft 64 at the end opposite from the gear 62. Gear 68 meshes with helical gear 70 at one end of shaft 72. Shaft 72 is supported within a bore of the housing 56 in the same manner as shaft 54.

Figure 2:
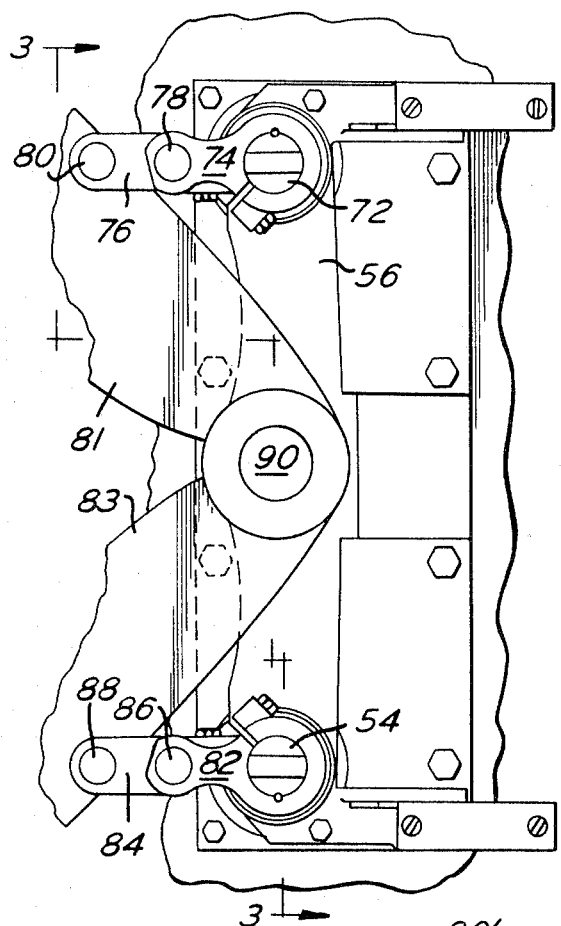
FIG. 2 is a top view taken along the line 2—2 in FIG. 1.

As shown more clearly in FIG. 2, and arm 74 is fixedly secured to the upper end of shaft 72. Arm 74 is pivotably connected to arm 76 by pin 78. Arm 76 terminates in a pin 80 which is pivotably connected to a mold holder arm 81 intermediate its length. One end of the mold holder arm is pivotably supported by pin 90 on housing 56.

Figure 5:
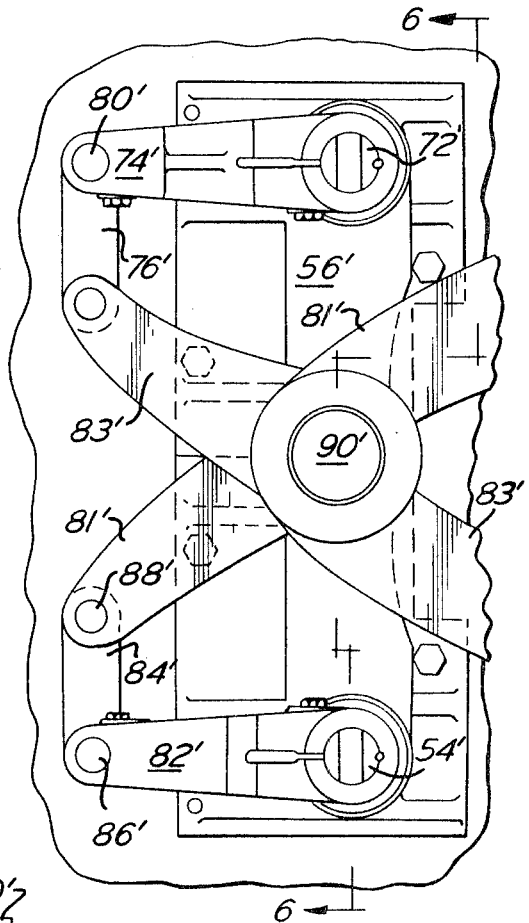
FIG. 5 is a top view taken along the line 5—5 in FIG. 1.
Figure 7:
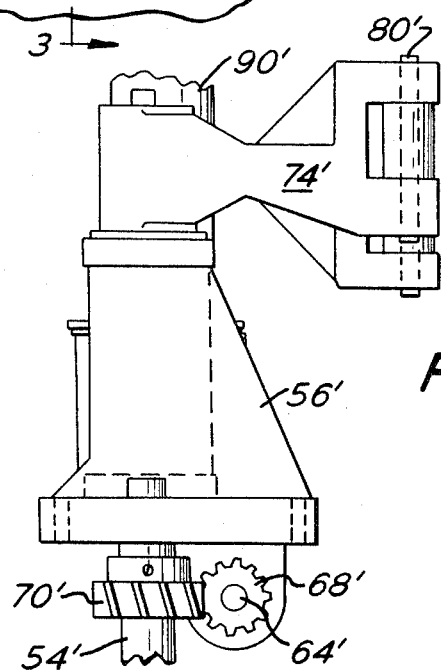
FIG. 7 is an end view taken along the line 7—7 in FIG. 6.

As shown more clearly in FIG. 2 and 4, an arm 82 is fixedly secured to the upper end of shaft 54. Arm 82 is pivotably connected to arm 84 by pin 86. Arm 84 terminates in a pin 88 pivotably connected to a mold holding arm 83 intermediate its length. One end of the arm 83 is pivotably supported by pin 90. The molds 28 and 30 are supported by the mold holder arms 83 and 81, respectively. As shown in FIG. 5, the mold holder arms 81' and 83' pivot on pin 90' like a pair of scissors.

A conventional control valve means is provided for sequentially introducing air into the opposite ends of the cylinders of air motors 32 and 32' so that the mold holder arms are sequentially operated at the mold stations 14 and 16. As is conventional in the art, molds 24 and 26 open before molds 28 and 30 begin to open. The mating gears 60 and 62 as well as gears 68 and 70 are designed so as to have a 1 to 1 gear ratio. Hence, the holding force applied by the molds 28 and 30 will be uniform.

Using motors 32 and 32' as disclosed in Pat. 1,911,119 and without changing the location thereof, and using the same air pressure of 30 p.s.i., we have increased the mold clamping force from about 900 pounds to about 1500 pounds. This increase in mold clamping force provides for improved seams on the container and thereby improves the quality of the product.

Maintenance is reduced since the number of moving parts is reduced as compared with the prior art. As the number of moving parts increases, there is a cumulative problem of wear, slippage and design tolerances. Further, down time is reduced since the major linkage between piston rod 36 and shaft 48 is replaceable as a unit. Since the housings 56 and 56' are readily detachable, access to shafts 64 and 64' may be easily attained. This is facilitated by the spline connection between shafts 48 and 54 which does not interfere with the removal of housings 56 and 56'.

The present invention may be embodied in other specific forms without departing from the spirit or essential attributes thereof and, accordingly, reference should be made to the appended claims, rather than to the foregoing specification as indicating the scope of the invention.

We claim:

1. An I.S. machine having a blow mold station and a blank mold station, a pair of blank mold holder arms at said blank mold station, a pair of blow mold holder arms at said blow mold station, actuating means for causing movement of the mold holder arms of each pair in unison in opposite directions for each of said stations, each actuating means including first and second shafts rotatable about their longitudinal axis and pivotably connected to one mold holder arm of a pair of such arms, motor means for oscillating the shafts connected to a pair of arms in unison in opposite directions, each first shaft being connected to its motor means, and means connecting each first shaft to the second shaft at its station for transmitting oscillatory motion thereto.

2. A machine in accordance with claim 1 including molds supported by each mold holder arm, an invert mechanism between said stations, and means pivotably supporting each mold holder arm between the first and second shafts at said stations.

3. A glassware forming machine comprising a mold station having mold holder arms, means for moving said arms in unison from an open position to a closed position including parallel first and second shafts each connected to one of said arms, a horizontal third shaft, gear means coupling said third shaft to said first and second shafts for transmitting motion between said shafts, an air motor connected through a single link directly to a horizontal lever arm, said motor being at an elevation below said third shaft, an upright drive shaft connected directly to said lever arm, means connecting said drive shaft to only one of said first and second shafts with the other shaft being connected to said motor only through said one shaft.

References Cited

UNITED STATES PATENTS

| | | | |
|---|---|---|---|
| 1,322,726 | 11/1919 | Owens | 65—360X |
| 1,745,794 | 2/1930 | Hatch | 65—360X |
| 1,875,796 | 9/1932 | Allen | 65—360 |
| 2,020,032 | 11/1935 | Kadow et al. | 65—360X |
| 2,378,176 | 6/1945 | Bert | 65—360 |
| 2,744,358 | 5/1956 | Rowe | 65—360X |
| 3,357,811 | 12/1967 | Youkers et al. | 65—360X |
| 3,460,931 | 8/1969 | Rowe | 65—360X |

FRANK W. MIGA, Primary Examiner

U.S. Cl. X.R.

65—361, 232, 235